(12) United States Patent
Millington

(10) Patent No.: US 6,385,542 B1
(45) Date of Patent: May 7, 2002

(54) MULTIPLE CONFIGURATIONS FOR A VEHICLE NAVIGATION SYSTEM

(75) Inventor: Jeffrey Alan Millington, Rochester Hills, MI (US)

(73) Assignee: Magellan DIS, Inc., Rochester Hills, MI (US)

(*) Notice: Subject to any disclaimer, the term of this patent is extended or adjusted under 35 U.S.C. 154(b) by 0 days.

(21) Appl. No.: 09/691,531

(22) Filed: Oct. 18, 2000

(51) Int. Cl.[7] ............................................. G06F 3/00
(52) U.S. Cl. ...................................... 701/213; 701/209
(58) Field of Search ................................. 701/213, 207, 701/208, 209, 24, 26; 345/339, 441, 348, 352, 354

(56) References Cited

U.S. PATENT DOCUMENTS

| | | | |
|---|---|---|---|
| 6,201,540 B1 | * | 3/2001 | Gallup et al. .................. 701/36 |
| 6,205,397 B1 | * | 3/2001 | Eslambolchi et al. ........ 701/213 |
| 6,212,474 B1 | * | 4/2001 | Fowler et al. ................ 701/213 |
| 6,148,261 A1 | * | 11/2001 | Obradovich et al. ......... 701/213 |

FOREIGN PATENT DOCUMENTS

EP 440105 * 8/1991 ................. 701/213

* cited by examiner

Primary Examiner—Richard M. Camby
(74) Attorney, Agent, or Firm—Carlson, Gaskey & Olds

(57) ABSTRACT

A navigation system includes an operator interface module ("OIM") which includes the user input devices, such as a keypad, and output devices, such as a display and audio speaker. The navigation system further includes a computer module which includes a CPU, mass storage (such as a hard drive), accelerometers and GPS receiver. In a method according to the present invention, the OIM displays a "select user" screen during navigation system power-up. The select user screen displays a plurality of user icons, each associated with a particular set of user definable settings. Upon selection of the particular user icon, the navigation system is configured according to the user definable navigation system settings. The user defined setting sets include, for example, the language, route preference type, default map scales and orientation, units, color settings, volume, alert tones, address book entries, and any other user definable settings that the particular user has previously set to personalize the system-user interface.

28 Claims, 4 Drawing Sheets

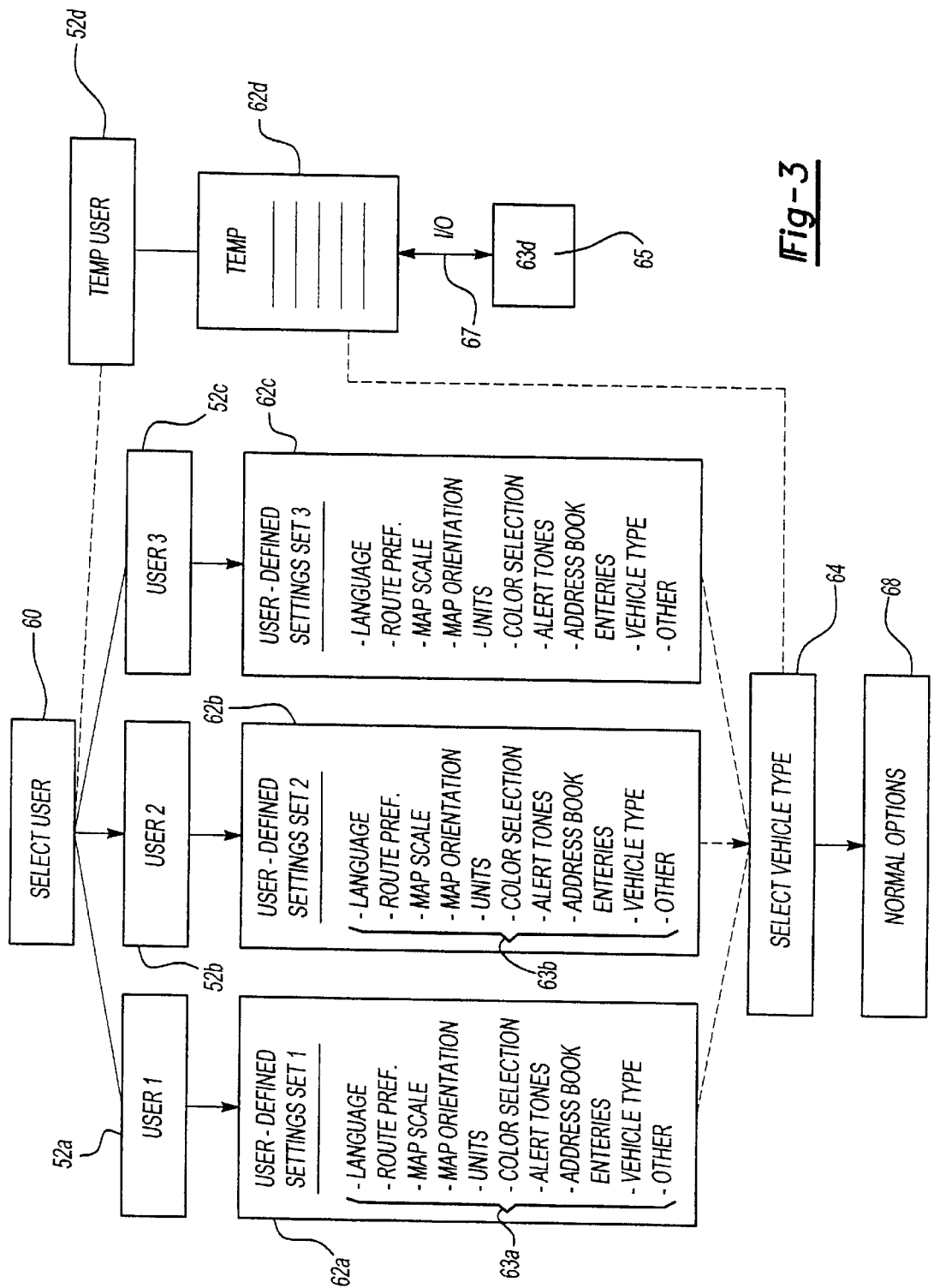

MULTIPLE CONFIGURATIONS FOR A VEHICLE NAVIGATION SYSTEM

BACKGROUND OF THE INVENTION

The present invention relates generally to vehicle navigation systems and more particularly to a vehicle navigation system, which provides multiple specific configurations which can be tailored to a particular user or vehicle type.

Navigation systems generally provide a recommended route from a starting point to a desired location. Generally, the starting point and desired location are selected from a large database of roads stored in a mass media storage which includes the roads in the area to be traveled by the user. The navigation system can be located in a personal computer or it can be installed in a vehicle. If the navigation system is installed in a vehicle, the starting point is typically the current position of the vehicle, which can be entered into the navigation system by an associated position determining system that usually includes a Global Positioning System (GPS) receiver.

The navigation system determines a route from the starting point to the destination utilizing an algorithm well-known to those in the art and currently in use in many navigation systems. Typical navigation systems select a recommended route based upon certain predetermined criteria including the length of the route and the estimated time of travel on the route. Depending upon the predetermined algorithm of the navigation system, the navigation system will recommend the route with the shortest total length, the lowest total time, or some weighted average of length and time.

In many households, however, a multiple of drivers may share the usage of a single navigation system equipped vehicle. The navigation system settings must therefore be set and reset during each driver's use of the vehicle according to that users particular preference. This may result in a reduction in the "user-friendliness"=0 of the navigation system. More particularly, one user's carefully set address book entries may be overwritten by another user's entries.

Although many households own more than one vehicle, the high cost of many of the vehicle navigation system components may make installation of a vehicle navigation system into each of the household vehicles impractical. It is known to provide vehicle navigation system that is transportable by a consumer between vehicles. More particularly, at least significant components of the vehicle navigation system are transportable between vehicles.

However, one the hardware is transferred between one vehicle to another, the navigation system will operate as it did in the original vehicle. For example, in many instances it may be necessary for the vehicle to change lanes prior to the maneuver because the maneuver could include exiting a highway, entering a highway, or making a turn at an intersection. Therefore, the upcoming maneuver is indicated to the driver at a distance before the maneuver so that proper vehicle positioning can be accomplished. Depending upon the type of vehicle in which the navigation system was initially installed, this distance may be inadequate or too long for the vehicle to which the navigation system was transported. For example, a driver may own a small vehicle for commuting to and from the workplace and the driver may also own a large vehicle for vacationing or a truck that has the capability of pulling a trailer. The larger vehicles will require additional time and distance to be in the proper position to make the upcoming maneuver as compared to the time and distance needed by the small vehicle or the truck without the trailer.

Accordingly, it is desirable to provide a navigation system that provides multiple configurations that allow each configuration to be tailored to a particular user.

SUMMARY OF THE INVENTION

The vehicle navigation system of the present invention includes an operator interface module ("OIM") which includes the user input devices, such as a keypad, and output devices, such as a display and audio speaker. The navigation system further includes a computer module which includes a CPU, mass storage (such as a hard drive), accelerometers and GPS receiver.

In a method according to the present invention, the OIM displays a "select user" screen during navigation system power-up. The select user screen displays a plurality of user icons, each associated with a particular set of user definable settings. Upon selection of the particular user icon, the navigation system is configured according to the user definable navigation system settings. The user defined setting sets include, for example, the language, route preference type, default map scales and orientation, units, color settings, volume, alert tones, address book entries, and any other user definable settings that the particular user has previously set to personalize the system-user interface.

In one embodiment, the user icons include a generic user identifications of "User 1", "User 2", and "User 3". However, it is preferred that the user icons can be remapped to provide specific user identification such as "Mike", "Amy", etc.

In another embodiment, one of the user definable settings is a vehicle type selection which is applicable to transportable vehicle navigation systems. By providing a vehicle type setting, the navigation system will be configured to provide additional time and distance to place a larger vehicle in the proper position for the next upcoming maneuver as compared to the time and distance needed by a smaller vehicle.

In yet another embodiment, an address book feature is preferably stored as one of the user definable settings to allow a user to store a plurality of locations in the database for later access. Each user thereby obtains access to their personal address book entries which contains previously stored locations when the particular user icon is selected.

Accordingly, the present invention provides a navigation system which is reconfigured to provide a personal interface to each of a multiple of users.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a flowchart illustrating the present invention.

DETAILED DESCRIPTION OF A PREFERRED EMBODIMENT

Figure 1:
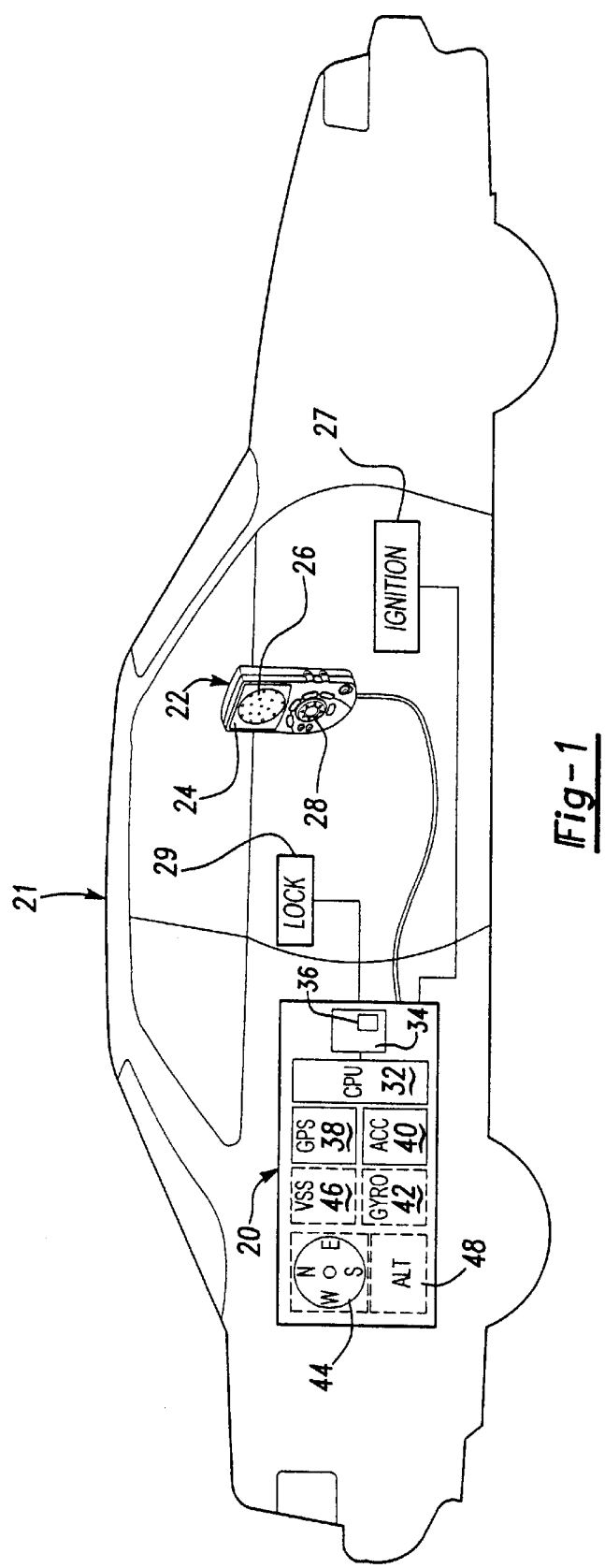
FIG. 1 is the navigation system of the present invention.

The navigation system 20 of the present invention is shown schematically in FIG. 1 installed in a vehicle 21. The navigation system 20 includes an Operator Interface Module ("OIM") 22 including input and output devices. The OIM 22 includes a display 24, such as high resolution LCD or flat panel display, and an audio speaker 26. The OIM 22 also includes input devices 28, preferably a plurality of buttons and directional keypad, but alternatively including a mouse, keyboard, keypad, remote device or microphone. Alternatively, the display 24 can be a touch screen display.

The navigation system 20 further includes a computer module 30 connected to the OIM 22. The computer module 30 includes a CPU 32 and storage device 34 connected to the CPU 32. The storage device 34 may include a hard drive, CD ROM, DVD, RAM, ROM or other optically readable storage, magnetic storage or integrated circuit. The storage device 34 contains a database 36 including a map of all the roads in the area to be traveled by the vehicle 21 as well as the locations of potential destinations, such as addresses, hotels, restaurants, or previously stored locations. The software for the CPU 32, including the graphical user interface, route guidance, operating system, positioning-determining software, etc. may also be stored in storage device 34 or alternatively in ROM, RAM or flash memory.

The computer module 30 preferably includes navigation sensors, such as a GPS receiver 38 and an inertial sensor, which is preferably a multi-axis accelerometer 40. The computer module 30 may alternatively or additionally include one or more gyros 42, a compass 44, a wheel speed sensor 46 and altimeter 48, all connected to the CPU 32. Such position and motion determining devices (as well as others) are well known and are commercially available. The vehicle navigation system 20 may also be a transportable system transportable between a plurality of vehicles as described in more detail in co-pending U.S. patent application Ser. No. 60/160,274, filed Oct. 19, 1999 entitled "TRANSPORTABLE VEHICLE NAVIGATION SYSTEM" which is incorporated by reference in its entirety into this description.

The vehicle navigation system 20 may also be an "off-board" system which will have particular components located remotely from the vehicle.

The navigation system 20 propagates the position of the vehicle 21 relative to the map database 36, i.e. relative positions on road segments and intersections ("nodes"). The navigation system 20 also determines the current location of the vehicle 21 in terms of latitude and longitude. Utilizing any of a variety of known techniques, the position of the vehicle 21 relative to the map database 36 and/or in terms of latitude and longitude is determined at least in part based upon the motion signals from the multi-axis accelerometer 40. The current local time and date can be determined from the GPS signals received by the GPS receiver 38.

Generally, the CPU 32 and position and motion determining devices determine the position of the vehicle 21 relative to the database 36 of roads utilizing dead reckoning, map-matching, etc. Further, as is known in navigation systems, the user can select a destination relative to the database 36 of roads utilizing the input device 28 and the display 24. The navigation system 20 then calculates and displays a recommended route on the display 24 directing the driver of the vehicle 21 to the desired destination. Preferably, the navigation system 20 displays turn-by-turn instructions on display 24 and gives corresponding audible instructions on audio speaker 26, guiding the driver to the desired destination.

Figure 2:
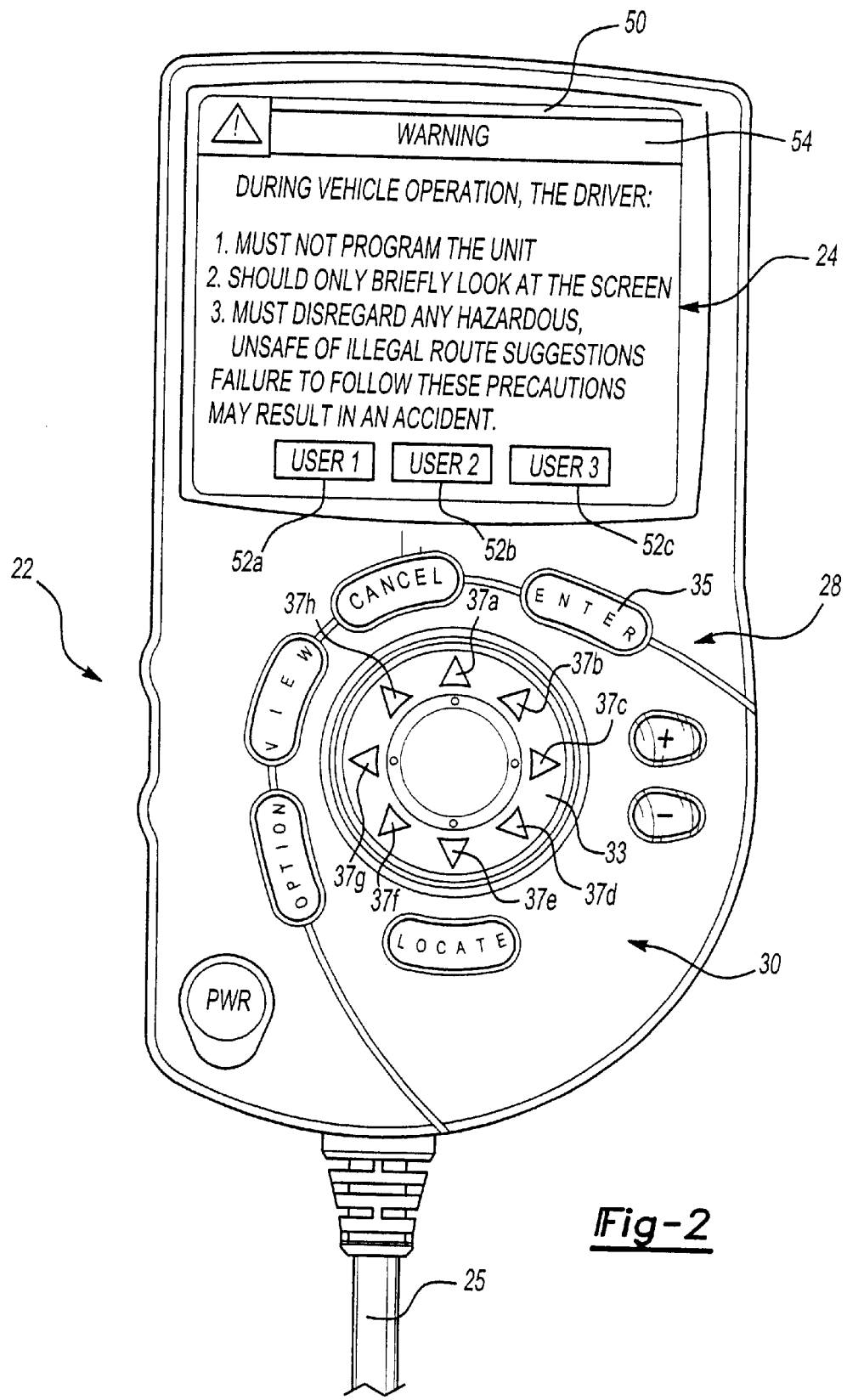
FIG. 2 is a general perspective view of the OIM of FIG. 1.

FIG. 2 is a perspective view of one disclosed embodiment of the OIM 22 having a display 24 and directional input device 28, preferably designed as an integral unit attached to the CPU by connection 25. The display device 24 includes a screen such as a high resolution LCD or flat panel display. The directional input device 28 includes a multiple of input buttons 30 including, preferably, an eight-way button shown generally at 33 and a selection key 35 such as an "Enter" key. The eight-way button 33 is preferably capable of moving in the direction of any one of the directional arrows 37a–h. Movement of the eight-way button 33 in the direction of one of the directional arrows 37a–h transmits a directional signal. Although an eight-way button 33 is shown, it will be realized that other input devices, such as a joystick, mouse or roller ball can be employed.

The OIM 22 display 24 is shown displaying a "select user" screen 50. The select user screen 50 displays a plurality of user icons 52a–c, each associated with a particular user as will be further described below. In addition to the user icons 52a–c, warning text 54 can also be provided on the select user screen 50. The warning text 45 preferably alerts a user various issues prior to use of the navigation system 20.

Through known software techniques, the eight-way button 33 is utilized to highlight a selected one of the plurality of user icons 52a–c (icon 52a shown selected). After selecting one of the user icons 52a–c, the user selects the selected icon utilizing the selection key 35.

Figure 2A:
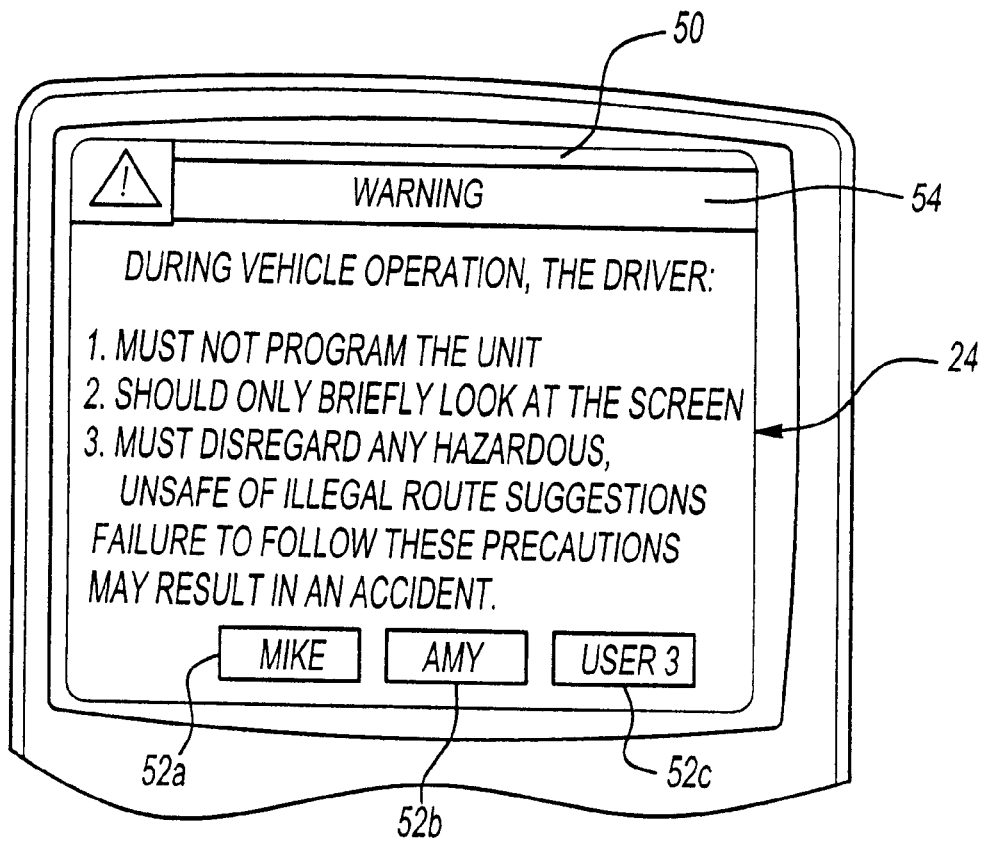
FIG. 2A is an enlarged view of the OIM of FIG. 2.

Although the user icons 52a–c (FIG. 2) include the generic user identification of "User 1", "User 2", and "User 3", it is preferred that the user icons 52a–c be remapped by the user to provide specific user identification. Referring to FIG. 2A, the icons 52a–c have been remapped as "Mike", "Amy", and "User 3". Entering of the characters to remap the user icons 52a–c preferably utilize the character entry system disclosed in co-pending application U.S. Pat. Ser. No. 09/096,103 entitled "A NAVIGATION SYSTEM CHARACTER INPUT DEVICE" filed on Mar. 10, 1998, which is hereby incorporated by reference. However, other entry systems will benefit from the present invention.

As will be further described below, the icons 52a–b that are remapped as "Mike" and "Amy", provide immediate availability of specific previously set configuration settings to the user. For this example, icon 52a ("Mike") is a user configuration in which user Mike has previously defined navigation system 20 settings. Thus, when Mike selects his icon 52a ("Mike"), user-defined navigation system settings such as the language, route preference type, default map scales and orientation, units, color settings, volume, alert tones, address book entries, and any other user definable settings will be those this particular user has previously set. These settings are preferably stored in the storage device 34 (FIG. 1). In this way, whenever the user Mike selects his icon 52a, he is presented with his personalized previously set navigation system interface.

Alternatively, or in addition a user configuration may also be selected when the user interfaces with a vehicle system such as, for example, an ignition switch 27, or lock module 29 (FIG. 1). The ignition switch 27 and lock module 29 preferably communicates with the system 20 to identify each user by a personal actuator 33 such as a personalized manual key or a passive entry key. Passive entry is known and typically includes a personal actuator such as a key fob which operates vehicle functions such as the vehicle ignition or vehicle lock system when a user is within a predefined distance of the vehicle 21. It is also known to personally identify manual keys to be so called "smart key" for each of a multiple of users. In this way, whenever the user operates the ignition switch 27 or lock module 29, the navigation system 20 will immediately identify the user configure based upon the personal key and the user is presented with his previously set navigation system interface.

Preferably, one of the user definable settings 63a–c (FIG. 3), applicable to transportable vehicle navigation systems, is a vehicle type selection. Vehicle type selection configures the navigation system 20 for a particular vehicle type as disclosed in co-pending application U.S. Pat. No. 6,078,864 "NAVIGATION SYSTEM WITH PREDETERMINED INDICATION OF NEXT MANEUVER" issued on Jun. 20, 2000, which is hereby incorporated by reference.

By providing a vehicle type setting, the navigation system 20 will be configured to provide additional time and distance to place a larger vehicle in the proper position for the next upcoming maneuver as compared to the time and distance needed by a smaller vehicle. Vehicle type settings can be preferably include, for example, motorcycle, small vehicle, large vehicle, large vehicle with trailer, recreational vehicle, or the like.

Icon 52b ("Amy") provides the immediate availability of specific previously set configuration settings for user Amy. Thus, when user Amy selects icon 52b, the navigation system 20 is configured to present user Amy with the settings that user Amy has previously set. In other words, the navigation system 20 provides a user interface that is personalized by the user.

Icon 52c has yet to be remapped and remains named the generic "User 3". It should be understood that the three user icons 52a–c which correspond to three configurations of user-defined navigation system setting sets, any number of icons and navigation system setting configurations can take advantage of the present invention.

Referring to FIG. 3, the method of the present invention and use of the graphical user interface shown in FIG. 2 will be described. When the navigation system 20 is powered up, the first system operation is the step of user selection 60. User selection is preferably displayed to the users by the "select user" screen 50 (FIG. 2).

Upon selection of the particular user icon 52a–c (FIG. 2), the navigation system 20 is configured according to the user defined setting sets 62a–c, each of which were previously stored in relation to the particular user icon 52a–c. Accordingly, when user Mike selects user icon 52a ("Mike") the user defined setting set 62a configures the navigation system 20 for user Mike. As illustrated, icon 52c remains named the generic "User 3" and the user defined setting set 62c is empty.

During operation of the navigation system 20, any of these user definable settings 63a within the set 62a can be altered in a known manner. Any changes are again stored in the storage device 34 (FIG. 1). The updated user defined setting set 62a is then provided when that particular user icon 52a–c is next selected.

In another disclosed embodiment, an address book feature is preferably stored as one of the user defined settings 63a–c in the user defined setting sets 62a–c. The address book feature allows a user to store a plurality of locations in the database 36 in a known manner for later access. Each user thereby obtains access to their personal address book entries which contains previously stored locations when particular user icon 52a–c is selected.

In another embodiment, a temporary user icon 52d can be displayed on the "select user" screen 50 (FIG. 2). The temporary user icon 52d is preferably associated with a temporary user defined setting set 62d which receives user definable settings 63d through an input/output port 67. The receive user definable settings 63d are preferably previously stored on removable storage media 65 such as a disk, flash memory, or the like. The removable storage media retains the predefined user definable settings 63d such that a user can temporarily install his or her particular user definable settings 63d into the temporary user defined setting set 62d to configure the navigation system 20. This is particularly advantageous when a user operates another's vehicle having a compatible navigation system 20.

In another disclosed embodiment, a select vehicle type step 64 is provided for transportable vehicle navigation systems. In addition to the user selection step 60, the select vehicle type step 64, forces the user to select the type of vehicle the navigation system 20 is currently installed in. As a user is typically more likely to drive certain vehicles, the vehicle type is preferably stored as one of the user defined settings 63a–c in the user defined setting sets 62a–c. The select vehicle type step 64 can thereby prompt a user to confirm the previously selected vehicle type or enter a new vehicle type if the navigation system has been moved to a different vehicle. However, it is preferred that the select vehicle type step 64 is always performed for transportable vehicle navigation systems to assure correct system settings in relation to the installed vehicle. By selecting the vehicle type, the multi-axis accelerometers, gyros and other motion related components are calibrated to the characteristics or the particular vehicle type.

After the user selection step 60 and the optional select vehicle type step 64, the navigation system 20 returns to normal operation at step 68. If the navigation system 20 is not transportable, the navigation system 20 proceeds directly from the user selection step 60 to the normal operation step 68.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle navigation system comprising:
   a database including a plurality of roads and a plurality of user defined setting sets;
   a plurality of user icons, each of said plurality of user icons relating to one of said plurality of user defined setting sets; and
   a user input device for selecting a desired destination for the vehicle relative to said database of roads and for selecting one of said plurality of user icons to configure said vehicle navigation system according to one of said plurality of user defined setting sets which relates to said selected user icon.

2. The navigation system of claim 1, further comprising a GPS receiver.

3. The navigation system of claim 1, further comprising at least one accelerometer.

4. The navigation system of claim 1, further comprising an operator interface module including a display.

5. The navigation system of claim 1, wherein a display displays a warning message in association with said plurality of user icons.

6. The navigation system of claim 1, wherein each of said plurality of user icons includes a generic user identification.

7. The navigation system of claim 6, wherein each of said plurality of user icons are remappable to provide a specific user defined identification.

8. The navigation system of claim 1, further includes means for determining a position of the navigation system relative to said plurality of roads.

9. The navigation system of claim 8, further including means for determining a route from a beginning point to an ending point via said plurality of roads.

10. The navigation system of claim 1, wherein each of said plurality of user defined setting sets includes an address book feature.

11. The navigation system of claim 1, wherein each of said plurality of user defined setting sets includes a map scale user definable setting.

12. The navigation system of claim 1, wherein each of said plurality of user defined setting sets includes a map orientation user definable setting.

13. The navigation system of claim 1, wherein each of said plurality of user defined setting sets includes a volume level user definable setting.

14. The navigation system of claim 1, wherein each of said plurality of user defined setting sets includes a color selection user definable setting.

15. The navigation system of claim 1, wherein each of said plurality of user defined setting sets includes a vehicle type user definable setting.

16. The navigation system of claim 1, wherein each of said plurality of user defined setting sets includes a language preference user definable setting.

17. The navigation system of claim 11, wherein said vehicle type user definable setting includes a plurality of performance parameters which configures said navigation system for use with a particular vehicle type.

18. The navigation system of claim 1, wherein said plurality of user icons includes a temporary user icon, said temporary user icon associated to configure said vehicle navigation system according to a user defined setting set which receives a plurality of user defined settings from a removable storage medium.

19. The navigation system of claim 1, further comprising a CPU which communicates with a vehicle system and said database, said vehicle system operable by an actuator, said CPU operable to configure said vehicle navigation system according to said one of said plurality of user defined setting sets in relation to said actuator.

20. The navigation system of claim 19, wherein said vehicle system includes an ignition switch.

21. The navigation system of claim 19, wherein said vehicle system includes a lock module.

22. The navigation system of claim 19, wherein said actuator includes a passive entry key.

23. The navigation system of claim 19, wherein said actuator includes a smart key.

24. A vehicle navigation system comprising:

a storage device for storing a database including a plurality of roads and a plurality of user defined setting sets;

a route determination system for determining a route to said destination via a plurality of maneuvers on said plurality of roads;

a position determining system including a GPS receiver, said position determining system determining a position of the vehicle relative to said plurality of roads;

a display for displaying a plurality of user icons, each of said plurality of user icons relating to one of said plurality of user defined setting sets; and a user input device for selecting a desired destination for the vehicle relative to said plurality f roads and for selecting one of said plurality of user icons to configure said vehicle navigation system according to one of said plurality of user defined setting sets which relates to said selected user icon.

25. The navigation system of claim 24, wherein said display displays a warning message in association with said plurality of user icons.

26. The navigation system of claim 24, wherein each of said plurality of user icons includes a generic user identification.

27. The navigation system of claim 26, wherein each of said plurality of user icons are remappable to provide a specific user defined identification.

28. The navigation system of claim 24, wherein each of user defined setting sets includes a plurality of user definable settings.

* * * * *